Jan. 6, 1959   D. S. POTTER   2,867,780
CERAMIC BARIUM TITANATE ELECTRO-MECHANICAL FILTER
Filed Oct. 29, 1956

NARROW BAND PASS
(LOOSE COUPLING OF DISCS)

BROAD BAND PASS
(TIGHT COUPLING OF DISCS)

INVENTOR.
DAVID S. POTTER
BY
ATTORNEYS

2,867,780

CERAMIC BARIUM TITANATE ELECTROMECHANICAL FILTER

David S. Potter, Seattle, Wash., assignor, by mesne assignments, to the United States of America as represented by the Secretary of the Navy Application October 29, 1956, Serial No. 619,092

4 Claims. (Cl. 333—72)

The present invention relates to electrical filters and more particularly it relates to a filter which is useful in intermediate frequency amplifiers of receiving systems.

The principal object of the invention is to provide an electrical filter which possess the quality of having a higher driving impedance and a smaller insertion loss than the known magneto-strictive type filter.

Another object of the invention is to provide a filter which is characterized by great simplicity.

A further object of the invention is to provide a filter whose band-pass characteristic may be easily varied.

Other objects and many of the attendant advantages of this invention will be readily appreciated as the same become better understood by reference to the following detailed description when considered in connection with the accompanying drawing wherein.

Figure 1:
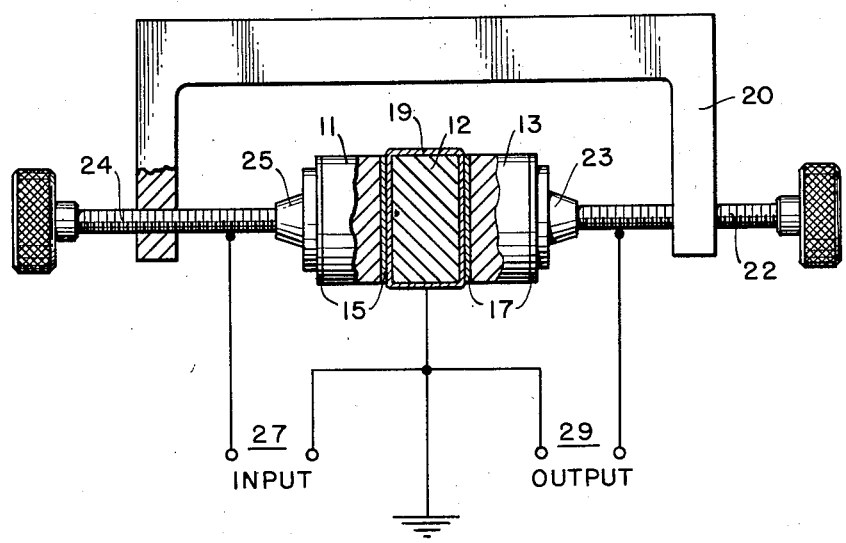
Fig. 1 is a diagrammatic view of the filter constituting the present invention.

Referring to Fig. 1 of the drawing, three filtering elements are shown at 11, 12 and 13. These filtering elements are constituted by electrically polarized barium titanate discs. The discs 11, 12 and 13 are arranged in axial alignment. Discs 11 and 13 are coated on their end faces with a layer of silver at 15 and 17; disc 12 has a silver coating 19 extending entirely about the element. The barium titanate discs 11, 12 and 13 are held in alignment by a clamp 20 having screws 22 and 24 terminating, respectively, in opposed clamping members 23 and 25. Clamp 20 is electrically non-conductive while screws 22 and 24, and clamping members 23 and 25 are made from an electrically conductive material.

Input terminals 27 and output terminals 29 are as indicated in Fig. 1. That is, input connections are made to discs 11 and 12 and output connections are made to discs 12 and 13; disc 12 being common and being connected to ground.

Figure 2:
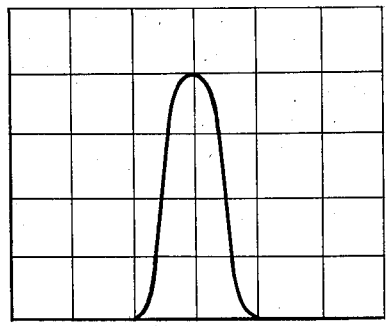
Fig. 2 is a chart showing an output curve obtained with the improved filter, with the filter elements loosely coupled.
Figure 3:
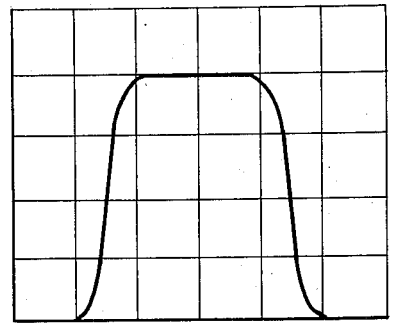
Fig. 3 is a chart similar to that of Fig. 2, but showing an output curve which is obtained from the filter with the filter elements tightly coupled.

To adjust the band-pass of the filter, the tightness of engagement of the barium titanate discs is varied, by rotating screws 22 and 24. For example, when a narrow band-pass is desired, such as shown in Fig. 2, the opposed faces of the discs 11, 12 and 13 are loosely coupled. Conversely, a wide band-pass characteristic, such as shown in Fig. 3, is obtained from a tight coupling or compression of the discs. As will be obvious, various circuit arrangements may be utilized in connection with the barium titanate filter.

In general, filters of the type described hereinabove show resonances for numerous modes. A typical band-pass has a "Q" of several hundred, for example, 2 kilocycles wide at ½ power level and a fall-off of 30 decibels in 15 kilocycles. Electrical coupling has been found to be an increasing function of compression.

Obviously, many modifications and variations of the present invention are possible in the light of the above teachings. It is therefore to be understood that within the scope of the appended claims the invention may be practiced otherwise than as specifically described.

What is claimed is:

1. An electrical filter which shows resonances for numerous modes comprising a plurality of cooperating electrically polarized barium titanate discs, means for mounting said discs adjacent each other in axial alignment with each other and having their opposed faces in close engagement, a highly conductive metallic coating on each of the opposed faces of said discs, said mounting means consisting of a non-conductive U-shaped clamp having screw adjusting means in each arm of said clamp for varying the tightness of engagement of said opposed faces for varying the pass-band width of the filter, and electrical input and output connections for said discs.

2. An electrical filter which shows resonances for numerous modes comprising three cooperating barium titanate discs, means for mounting said discs adjacent each other in axial alignment with each other and having their opposed faces in close engagement, a thin metallic coating on each of the opposed faces of said discs, said mounting means consisting of a non-conductive U-shaped clamp having screw adjusting means in each arm of said clamp for varying the pressure of engagement of said opposed faces for varying the pass-band width of the filter, electrical input connections to the first and second of said discs, and electrical output connections to the second and third of said discs, said second disc being common and connected to ground.

3. A device as in claim 2 wherein said second disc has a metallic coating about its entire surface.

4. A device as in claim 2 wherein said discs are a pre-polarized ceramic barium titanate, and said metallic coating is silver.

References Cited in the file of this patent

UNITED STATES PATENTS

| | | |
|---|---|---|
| 2,240,293 | Goddard | Apr. 29, 1941 |
| 2,711,515 | Mason | June 21, 1955 |
| 2,759,102 | Burns | Aug. 14, 1956 |
| 2,803,803 | Jonker et al. | Aug. 20, 1957 |